L. & I. R. BLEITZ.
SPEED VARYING AND REVERSING MECHANISM.
APPLICATION FILED APR. 2, 1910.
967,164. Patented Aug. 16, 1910.
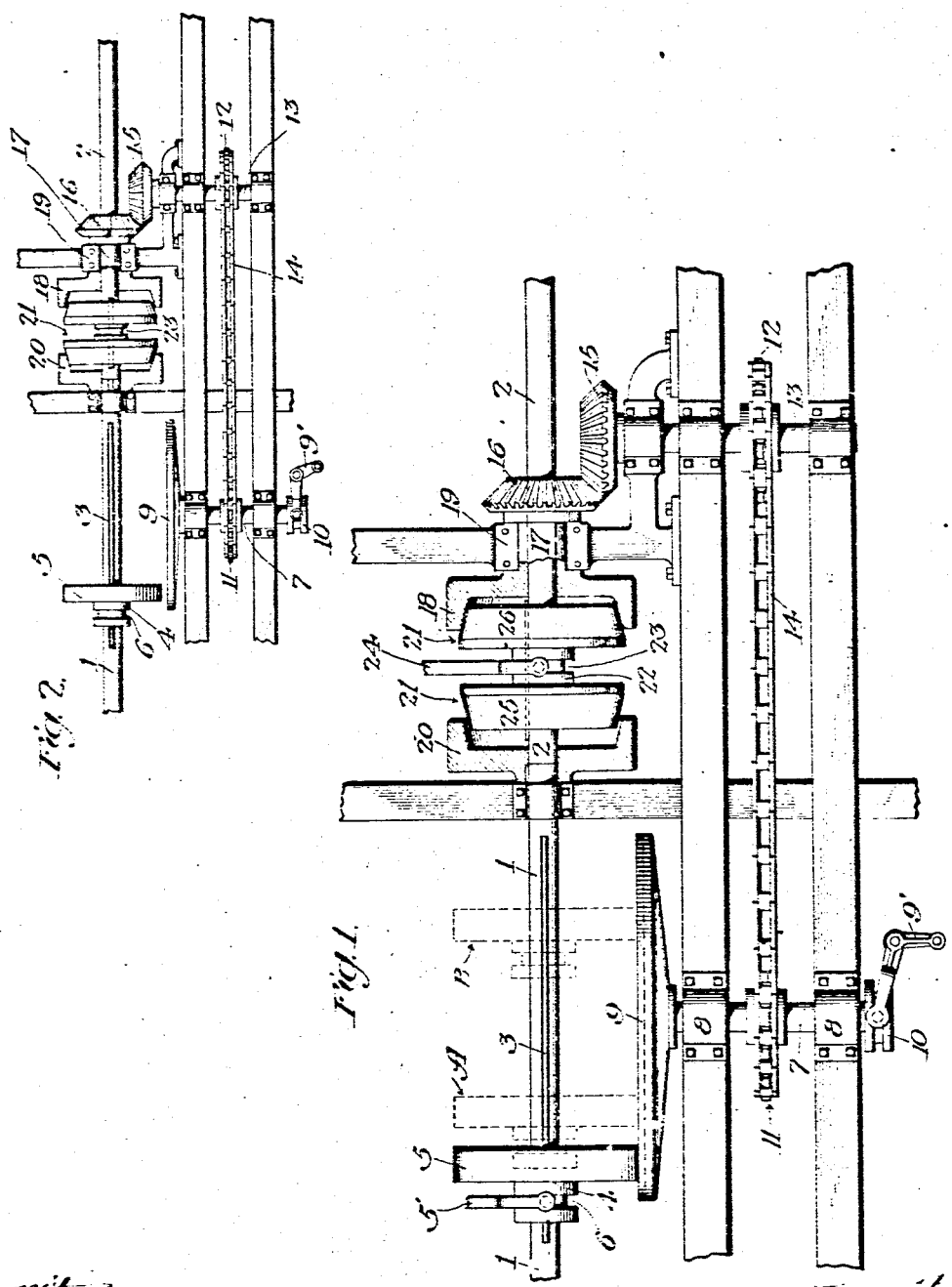

UNITED STATES PATENT OFFICE.

LOUIS BLEITZ AND LOUIS ROLLEN BLEITZ, OF LOS ANGELES, CALIFORNIA.

SPEED VARYING AND REVERSING MECHANISM.

967,164.    Specification of Letters Patent.    Patented Aug. 16, 1910.

Application filed April 2, 1910. Serial No. 553,142.

*To all whom it may concern:*

Be it known that we, LOUIS BLEITZ and LOUIS ROLLEN BLEITZ, both citizens of the United States, and residents of Los Angeles, in the county of Los Angeles and State of California, have invented a new and useful Speed Varying and Reversing Mechanism, of which the following is a specification.

This invention relates to that type of speed varying and reversing mechanism in which a pair of friction disks are interposed between the driving shaft and the driven shaft and one of the main objects of the present invention is to produce a device of the character described in which the friction disks are used to build up the speed of the driven shaft to engine speed, after which the engine shaft and the driven shaft may be clutched together and the friction released, thereby producing a direct drive at engine speed.

Another object of the invention is to so arrange the friction disks that the driving friction disk is on the greatest diameter of the driven friction disk at low speed, thereby getting the greatest power at the most desired point.

Another object of the invention is to produce a device of the character described of simple construction, compact in form which may be operated with great simplicity.

Other objects and advantages will appear as hereinafter described.

Referring to the drawings: Figure 1 is a plan view, partly in section, showing the transmission mechanism of an automobile embodying our invention, the parts being in position for low speed. Fig. 2 is a view similar to Fig. 1, showing the parts in position for direct drive from engine.

1 designates the engine or driving shaft of an automobile and 2 the driven shaft suitably mounted in alinement with the driving shaft 1. The driving shaft 1 is provided with a spline 3 which engages a groove in the hub 4 of a friction driving disk 5, the disk 5 rotates with the shaft 1 but is movable longitudinally along the shaft 1 by means of a lever 5' or other suitable mechanism in engagement with an annular groove 6 formed in an extension of the hub 4.

Mounted on a shaft 7 in bearings 8 at right angles to the friction driving disk 5 is a friction driven disk 9 which may be shifted longitudinally by means of a suitable lever 9' in engagement with a grooved collar 10. The shaft 7 has mounted thereon a sprocket wheel 11 for driving a sprocket wheel 12 on a counter shaft 13 through the medium of a sprocket chain 14.

The shaft 13 has fixed thereon a bevel gear 15 which meshes with a bevel gear 16 on the end of a sleeve 17 formed as an extension on a clutch drum 18. The drum 18, sleeve 17 and gear 16 are preferably formed integral, as above described, and are loosely mounted on the shaft 2, being supported in a bearing 19.

Keyed to the end of the shaft 1 and rotatable therewith is a clutch drum 20. The shaft 1 extends partly through the drum 20 and abuts against the end of the shaft 2 which enters within the central bore of the drum 20 a sufficient distance to center the shaft 2 in proper alinement with the shaft 1 and at the same time afford a support for the end of the shaft 2.

Splined to the shaft 2 and slidable longitudinally thereon is a clutch member 21 having a central hub member 22 provided with an annular groove 23 for engagement with a suitable lever 24 or other device to shift the member 21 along the shaft 2. The clutch member 21 is provided with two cone friction members 25, 26 adapted to engage drums 20 and 18 respectively, as hereinafter described.

The friction driving disk 5 is preferably made of fiber and the friction driven disk 9 of aluminum or other suitable metal, but it is understood that we do not limit the invention to the use of the materials as specified nor to the specific form or size of the various parts illustrated in the drawings.

The driving disk 5 is of smaller diameter than the driven disk 9 so that, as illustrated in Fig. 1, with the driving disk 5 near the greatest diameter of the driven disk 9, the speed of the driven disk 9 is slower than the driving disk 5 which being on the engine shaft 1 moves at the same speed as the engine. The disk 9 on shaft 7 drives sprocket 11, chain 14, sprocket 12, shaft 13, and gear 15 which in turn drives gear 16 and drum 18 and the latter being loosely mounted on the shaft 2 imparts no movement thereto until by shifting the lever 24 the cone 26 is moved into engagement with the drum 18, thereby driving the shaft 2 at a lower speed than the shaft 1, the gears 15 and 16, and sprockets 11 and 12 being of the same ratio respectively. It is obvious that by varying the relative sizes of the sprockets the device may be readily adapted to meet the requirements of special cases.

To increase the speed of the driven shaft 2, the disk 5 is moved toward the center of the disk 9 giving a gradual increase of speed, and by moving the disk into the dotted position "A" which is at a point where the diameter of contact of the disk 5 on the face of the disk 9 is equal to the diameter of the driving disk 5 the shaft 2 will be driven at the same speed as the shaft 1. At this point the lever 24 may be shifted, thereby throwing the cone 26 out of engagement with the driver 18 and the cone 25 into engagement with the drum 20 which clutches the shaft 1 to the shaft 2, which is driven directly from the driving shaft 1 through drum 20 and cone 25, the cone 25 being splined on the shaft 2, as hereinbefore described. At this time the drum 18 is being driven as hereinbefore described from the disk 9, but to relieve the friction disks the shaft 7 carrying the disk 9 may be moved slightly a sufficient distance to break the contact between the disks 9 and 5 and the disk 9 and parts connected therewith remain stationary until the disk 9 is moved into contact with the disk 5. To obtain a lower speed the reverse of the above operation is performed.

If it is desired to run faster than engine speed when the driving disk 5 reaches the dotted position "A," the operation as above described of connecting the shafts 1 and 2 direct is not performed but the disk 5 is moved nearer the center of the disk 9 and a higher speed of the shaft 2 is attained through the friction drive of the disk 5 to the disk 9 and the parts driven by disk 9, as heretofore described.

It is to be noted that by arranging the driving disk 5 and driven disk 9 as shown, the disk 5 is at the greatest diameter of the disk 9 when driving at the lowest speed, at this point the greatest power is necessary and the disk 5 driving on a great diameter, the minimum amount of slippage takes place. As the disk 5 moves toward the center of disk 9, the speed increases and the diameter of the disk 9 decreases proportionately, resulting in an ideal condition for friction drive.

To reverse the drive the disk 9 is moved out of engagement with the disk 5 and the latter disk is moved across the center of disk 9 to the other side thereof to position shown in dotted lines "B" after which disk 9 is moved into contact with the disk 5 and the parts hereinbefore driven by disk 9 are driven in the reverse direction.

What we claim is:—

1. In a speed varying and reversing mechanism, the combination of a driving shaft, a clutch member fixed to said driving shaft, a friction driving member longitudinally adjustable on said driving shaft, a friction driven member, a driven shaft in longitudinal alinement with the driving shaft, a clutch member loosely mounted on the driven shaft, means for driving the clutch member on the driven shaft from said friction driven member, means for engaging said clutch member on the driven shaft with the driven shaft, and means for engaging the clutch member on the driving shaft with the driven shaft.

2. In a speed varying and reversing mechanism, the combination of a driving shaft, a clutch member fixed to said driving shaft, a friction driving member longitudinally adjustable on said driving shaft, a friction driven member, a driven shaft in longitudinal alinement with the driving shaft, a clutch member loosely mounted on the driven shaft, means for driving the clutch member on the driven shaft from said friction driven member, means for engaging said clutch member on the driven shaft with the driven shaft, means for engaging the clutch member on the driving shaft with the driven shaft, and means for disengaging the friction members.

In testimony whereof, we have hereunto set our hands at Los Angeles California this 26th day of March 1910.

LOUIS BLEITZ.
LOUIS ROLLEN BLEITZ.

In presence of—
FRANK L. A. GRAHAM,
P. H. SHELTON.